(12) United States Patent
Giesberts et al.

(10) Patent No.: US 7,489,688 B2
(45) Date of Patent: Feb. 10, 2009

(54) FRAME AGGREGATION

(75) Inventors: Pieter-Paul S. Giesberts, Utrecht (NL); Richard M. van Leeuwen, Zoetermeer (NL)

(73) Assignee: Agere Systems Inc., Allentown, PA (US)

( * ) Notice: Subject to any disclaimer, the term of this patent is extended or adjusted under 35 U.S.C. 154(b) by 712 days.

(21) Appl. No.: 10/955,943

(22) Filed: Sep. 30, 2004

(65) Prior Publication Data
US 2005/0152358 A1 Jul. 14, 2005

Related U.S. Application Data

(63) Continuation-in-part of application No. 10/746,153, filed on Dec. 24, 2003.

(60) Provisional application No. 60/532,325, filed on Dec. 23, 2003.

(51) Int. Cl.
*H04L 12/28* (2006.01)
(52) U.S. Cl. ........................ 370/392; 370/400
(58) Field of Classification Search ............... None
See application file for complete search history.

(56) References Cited

U.S. PATENT DOCUMENTS

| 4,727,536 | A | 2/1988 | Reeves et al. ............... 370/84 |
| 5,467,342 | A | 11/1995 | Logston et al. .............. 370/17 |
| 5,583,859 | A | 12/1996 | Feldmeier ................... 370/471 |
| 6,041,051 | A | 3/2000 | Doshi et al. |
| 6,236,647 | B1 | 5/2001 | Amalfitano ................ 370/335 |
| 6,317,430 | B1 | 11/2001 | Knisley et al. |
| 6,452,946 | B1 | 9/2002 | Manzardo .................. 370/487 |
| 6,594,278 | B1 | 7/2003 | Baroudi ..................... 370/466 |
| 6,640,248 | B1 | 10/2003 | Jorgensen |

(Continued)

FOREIGN PATENT DOCUMENTS

EP 0 912 016 A2 4/1999

(Continued)

OTHER PUBLICATIONS

"Energy Saving in IEEE 802.11 Communications Using Frame Aggregation," by Jean Lorchat et al., GLOBECOM 2003, IEEE Global Telecommunications Conference. Conference Proceedings, San Francisco, Dec 1-5, 2003, IEEE Global Telecommunications Conference, New York, NY, IEEE, US, vol. 7 of 7, pp. 1296-1300, XP010677504.

(Continued)

*Primary Examiner*—Edan Orgad
*Assistant Examiner*—Jung Park
(74) *Attorney, Agent, or Firm*—Mendelsohn & Assoc., P.C.; Kevin M. Drucker; Steve Mendelsohn

(57) ABSTRACT

A packet network employs frame aggregation to reduce the number of physical-layer frames employed to transfer a given amount of user data. A packet network might employ physical (PHY) and medium access control (MAC) layers of a wireless local area network (WLAN) operating in accordance with one or more IEEE 802.11 standards. Frame aggregation combines several separate, higher-layer frames with user data into one PHY-layer frame, thus increasing the amount of user data per PHY-layer frame transmitted. Frame aggregation improves the efficiency by reducing both PHY-layer overhead and MAC-layer overhead.

26 Claims, 13 Drawing Sheets

U.S. PATENT DOCUMENTS

| | | | |
|---|---|---|---|
| 6,775,804 B1 | 8/2004 | Dawson | 714/776 |
| 6,859,501 B1 | 2/2005 | Zimmermann et al. | 375/260 |
| 6,865,163 B1 | 3/2005 | Bergenwall et al. | 370/288 |
| 6,877,043 B2 | 4/2005 | Mallory et al. | 709/251 |
| 6,928,289 B1 | 8/2005 | Cho et al. | 455/452.2 |
| 6,987,770 B1 * | 1/2006 | Yonge, III | 370/401 |
| 7,231,530 B1 | 6/2007 | Miller et al. | 713/320 |
| 7,298,691 B1 | 11/2007 | Yonge, III et al. | 370/203 |
| 2001/0024435 A1 | 9/2001 | Birdwell et al. | 370/349 |
| 2002/0093928 A1 | 7/2002 | LoGalbo et al. | 370/336 |
| 2002/0110148 A1 * | 8/2002 | Hickman et al. | 370/475 |
| 2003/0086366 A1 | 5/2003 | Branlund et al. | 370/208 |
| 2003/0128706 A1 * | 7/2003 | Mark et al. | 370/395.1 |
| 2003/0135640 A1 | 7/2003 | Ho et al. | 709/237 |
| 2003/0169769 A1 | 9/2003 | Ho et al. | |
| 2003/0171114 A1 * | 9/2003 | Hastings | 455/426.2 |
| 2004/0052273 A1 * | 3/2004 | Karaoguz et al. | 370/465 |
| 2004/0141460 A1 | 7/2004 | Holtzman et al. | 370/216 |
| 2004/0180696 A1 | 9/2004 | Foore et al. | 455/561 |
| 2004/0240424 A1 | 12/2004 | Fong et al. | 370/349 |
| 2005/0053037 A1 | 3/2005 | Ginzburg et al. | 370/333 |
| 2005/0286523 A1 | 12/2005 | Liao et al. | 370/389 |
| 2007/0101020 A1 | 5/2007 | Lin et al. | 709/238 |

FOREIGN PATENT DOCUMENTS

| | | |
|---|---|---|
| EP | 0 987 842 A1 | 3/2000 |
| GB | 2 315 694 A | 2/1998 |
| GB | 2 315 964 A | 2/1998 |
| JP | 2000-295313 | 10/2000 |
| WO | WO 99/63703 | 12/1999 |
| WO | WO 02/05453 A2 | 1/2002 |
| WO | WO 2004/039011 A2 | 5/2004 |

OTHER PUBLICATIONS

"Data Link Frame Aggregation Protocol," by J. Michael Meehan et al., International Conference O-N Computers and Their Applications, Proceedings of ISCA Cata, Apr. 4, 2006, San Francisco, CA, pp. 1-4, XP009044947.

"802.11a Modeling and MAC Enhancements for High Speed Rate Adaptive Networks" by Ka Yeung, Dec. 12, 2002, UCLA, 19 pages.

* cited by examiner

FRAME AGGREGATION

CROSS-REFERENCE TO RELATED APPLICATIONS

This application claims the benefit of the filing date of U.S. provisional application No. 60/532,325, filed on Dec. 23, 2003.

This application is a continuation-in-part of U.S. patent application Ser. No. 10/746,153, filed Dec. 24, 2003, the teachings of which are incorporated herein by reference.

BACKGROUND OF THE INVENTION

This application is related to U.S. patent application Ser. No. 10/955,947, filed Sep. 30, 2004, the teachings of which are incorporated herein by reference.

1. Field of the Invention

The present invention relates to communication systems, and, in particular, to aggregation of data frames in a packet-based network.

2. Description of the Related Art

Wireless local area networks (WLANs) include one or more fixed/non-fixed position stations (STAs, such as mobile terminals), including cell phones, notebook (laptop) computers, and hand-held computers, that are equipped with generally available WLAN PC cards. WLAN PC cards enable STAs to communicate among themselves when located within the same service area as well as through a network server when located in different service areas. The network server provides support for communication between STAs in different service areas that are supported by different access points (APs). An AP is a terminal or other device that provides connectivity to other networks or service areas, and may be either fixed or non-fixed. A basic service set (BSS) is formed between STAs and/or between an AP and one or more STAs. Such WLAN networks allow STAs to be moved within a particular service area without regard to physical connections among the mobile terminals within that service area.

An example of a WLAN network is a network that conforms to standards developed and proposed by the Institute of Electrical and Electronic Engineers (IEEE) 802.11 Committee (referred to herein as a network operating in accordance with one or more editions of the IEEE 802.11 standard). Typically, all messages transmitted among the mobile terminals of the same service area (i.e., those terminals associated with the same AP) in such WLAN networks are transmitted to the access point (AP) rather than being directly transmitted between the mobile terminals. Such centralized wireless communication provides significant advantages in terms of simplicity of the communication link as well as in power savings.

Most networks are organized as a series of layers (a layered-network architecture), each layer built upon its predecessor. The purpose of each layer is to offer services to the higher layers, shielding those layers from implementation details of lower layers. Between each pair of adjacent layers is an interface that defines those services. The lowest layers are the data link and physical layers. The function of the data link layer is to partition input data into data frames and transmit the frames over the physical layer sequentially. Each data frame includes a header that contains control and sequence information for the frames. The function of the lowest level, the physical layer, is to transfer bits over a communication medium.

FIG. 1 shows a prior art framing sequence for user data in accordance with an 802.11-compliant WLAN. As shown in FIG. 1, six protocol layers are shown as application layer 150, transmission control protocol (TCP) layer 151, Internet protocol (IP) layer 152, logical link control (LLC) layer 153 (a sub-layer in the data link layer), medium access control (MAC) layer 154 (also a sub-layer in the data link layer), and physical (PHY) layer 155 (the physical layer). User data 101 is provided to application layer 150, which generates application data 102 by appending application-layer header 110. Application data 102 is provided to TCP layer 151, which appends TCP header 111 to application data 102 to form TCP segment 103. IP layer 152 appends IP header 112 to TCP segment 103 to form IP frame 104. IP frame 104 might be a typical TCP/IP packet that is commonly employed in many data networking applications including some that are not necessarily 802.11-compliant.

LLC layer 153 provides a uniform interface between MAC layer 154 and higher layers, providing transparency of the type of WLAN used to transport the TCP/IP packet. LLC layer 153 appends this interface information as LLC header 113 to IP frame 104 to form LLC frame 105.

In 802.11-compliant WLANs, the physical device is a radio and the physical communication medium is free space. A MAC device and a PHY-layer signaling control device ensure two network stations are communicating with the correct frame format and protocol. The IEEE 802.11 standard for WLANs defines the communication protocol between two (or more) peer PHY devices as well as between the associated peer MAC devices. According to the 802.11 WLAN data communication protocol, each packet frame transferred between the MAC device and the PHY device has a PHY header, a MAC header, MAC data, and error checking fields. A typical format for the MAC-layer frame of 802.11-compliant WLAN systems appends MAC header 114 and frame check sequence (FCS) 115 to LLC frame 105 to form MAC frame 106. MAC header 114 includes frame control, duration identification (ID), source (i.e., MAC layer) and destination address, and data sequence control (number) fields. The data sequence control field provides sequence-numbering information that allows a receiver to reconstruct the data sequence order since the user data is a portion of a larger user data steam.

PHY layer 155 forms a physical-layer packet frame 107 by appending PHY header 118 to MAC frame 106. PHY header 118 includes preamble 116 and physical-layer convergence protocol (PLCP) header 117. PLCP header 117 identifies, for example, the data rate and length of PHY layer 155, and preamble 116 might be used by a receiving device to i) detect/synchronize to the incoming frame and ii) estimate the channel characteristics between the transmitter and receiver.

In typical communication between devices in accordance with the 802.11 standard, every MAC-layer frame is acknowledged with an ACK message (or ACK frame) that is sent a short interframe space (SIFS) period after the initial physical-layer frame is sent. In the 802.11e standard specification, some alternative acknowledgment methods are specified, such as "No-ACK" in which no acknowledgment message is sent at all. Other possible methods include variations of Block-ACK, where multiple data frames can be acknowledged in one Block-ACK message, which Block-ACK message is sent either immediately after a Block-ACK request (immediate Block-ACK) or after a separate contention period (delayed Block-ACK).

One factor that affects the maximum achievable throughput of 802.11 WLAN systems at a given layer is the length of the frames that carry the payload (e.g., user data 101). With relatively good channel quality, the throughput efficiency increases with increasing frame size. This increase in throughput efficiency is related to the fixed-size of the overhead (e.g., header, checksum) of the layer, since, as frame size increases, the ratio of overhead to data decreases. In some prior art 802.11-compliant WLANs, each transmitted PHY-layer packet frame contains exactly one MAC frame. MAC frames might be control or management frames, such as probe request or acknowledgment frames. Other MAC frames are data frames that contain exactly one packet of higher-layer user data. The MAC header and FCS field are included in the packet overhead.

The efficiency of the IEEE 802.11 protocol degrades when higher physical-layer data rates are used. This is caused by several sources of overhead, both on the PHY-layer and MAC-layer levels, such as preamble, inter-frame space (IFS) timing, and header information, and also acknowledgment packets. IEEE 802.11 proposes some methods to improve efficiency, such as burst packet transmission and Block-ACK messaging, but these methods do not enable efficient use of PHY-layer rates of 162 Mbit/s or higher.

At the PHY layer, overhead is introduced by the PHY-frame preamble and by the PLCP header, which are both of a constant size for each MAC data frame. Thus, the medium is more efficiently used if a larger amount of data is carried per packet. Also, because PHY-layer frame overhead is generally constant in time rather than in size (i.e., number of bytes), PHY layer frame overhead does not scale with higher data bit rates. Reducing the number of PHY frames for a given amount of transmitted user data can result in a significant improvement in efficiency. Because the PHY-layer overhead is included in every transmitted MAC frame, including those MAC frames not directly related to user data transfer (e.g., probe requests, RTS/CTS and Acknowledgment frames), reducing the number of separately transmitted MAC frames improves efficiency. Reducing the number of PHY frames also reduces the MAC contention overhead.

SUMMARY OF THE INVENTION

In accordance with embodiments of the present invention, a packet network employs frame aggregation to reduce the number of physical-layer frames employed to transfer a given amount of user data. The packet network uses physical (PHY) and medium access control (MAC) layers of a wireless local area network (WLAN) operating in accordance with one or more IEEE 802.11 standards. Frame aggregation combines several separate higher-layer frames with data, such as user or management/control data, into one PHY-layer frame, thus increasing the amount of user data per PHY-layer frame transmitted. Frame aggregation improves the efficiency by reducing both PHY-layer overhead (e.g., preambles and PLCP header overhead) and MAC overhead (e.g., contention overhead).

In accordance with one exemplary embodiment of the present invention, a frame of aggregated data is generated by (a) associating one or more user data frames into aggregated user data in accordance with a first layer; (b) generating, at an aggregation layer, one or more sub-frames from the aggregated user data by appending at least one header to the aggregated data, each sub-frame having a format in accordance with a second layer; and (c) forming an aggregated frame from the one or more sub-frames in accordance with a third layer.

In accordance with another exemplary embodiment of the present invention, a frame of aggregated data is generated by (a) associating one or more user data frames into aggregated user data based on one of a plurality of aggregation formats; (b) generating, at an aggregation layer, one or more sub-frames from the aggregated user data by adding at least one header to the aggregated data; and (c) forming an aggregated frame from the one or more sub-frames.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
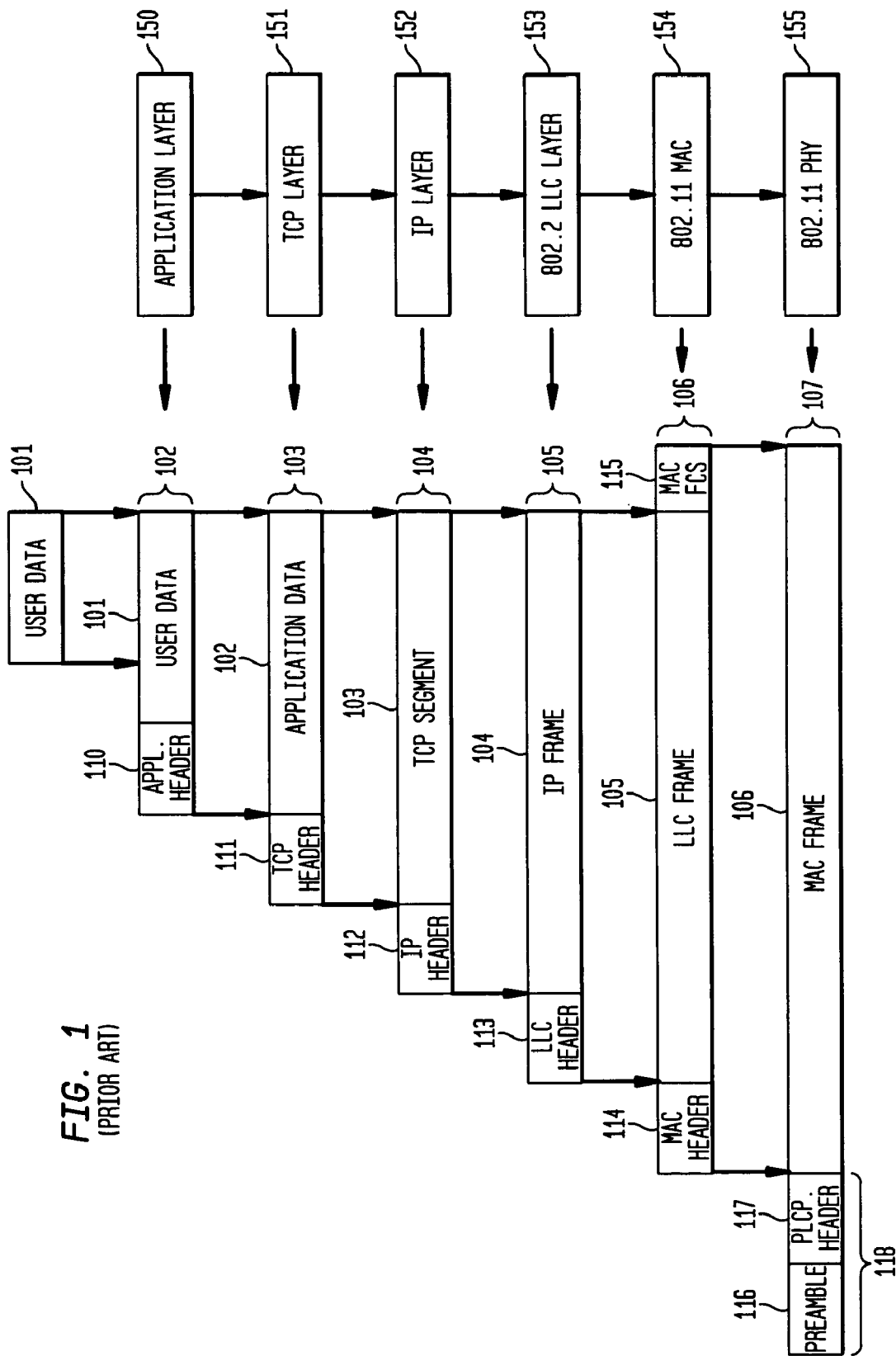
FIG. 1 shows a prior art framing sequence for user data in accordance with an 802.11 wireless local area network (WLAN) standard.

In accordance with exemplary embodiments of the present invention, frame aggregation reduces the number of, for example, physical-layer frames employed to transfer a given amount of user data. The exemplary embodiments described herein relate to a system operating in accordance with one or more IEEE 802.11 standards, which standards define the physical (PHY) and medium access control (MAC) layers of a wireless local area network (WLAN). However, one skilled in the art might apply the teachings herein to other packet-based communication networks. As described herein, higher layers, such as logical link control (LLC), Internet Protocol (IP), and transmission control protocol/user datagram protocol (TCP/UDP) layers, might be outside of the control of a lower-layer (e.g., 802.11) standard. Consequently, exemplary embodiments of the present invention employ frame aggregation to combine several separate higher-layer frames with user data into one PHY-level frame, thus increasing the amount of user data per PHY frame transmitted. Frame aggregation improves the efficiency by reducing both PHY overhead (e.g., preambles and PLCP header overhead) and MAC overhead (e.g., contention overhead).

For frame aggregation in accordance with exemplary embodiments of the present invention, several frames might be aggregated for: A) frames having the same destination address and the same PHY-layer data rate, B) frames having one or more destination addresses and the same PHY-layer data rate, and C) frames having one or more destination addresses with each frame having one of several possible PHY-layer data rates.

Aggregating frames having the same destination address and the same PHY-layer data rate, termed herein "Case A", might require little or no changes in prior art MAC-layer and PHY-layer operation, and might preferably be employed when many frames specify the same destination address. For example, uplink communication (traffic) in a basic service set (BSS) might typically employ frame aggregation in accordance with Case A.

Aggregating frames having different destination addresses and the same PHY layer data rate, termed herein "Case B", might typically be employed for stations (STAs) or access points (APs) that transfer data for different destination STAs. However, since the frames are sent on one data rate, the different destination STAs will preferably experience similar channel conditions. For Case B, a scheduling method selects frames for aggregation and schedules transmission, which for some embodiments might include accounting for packets having differing transmit priorities.

Aggregating frames having one or more destination addresses with each frame having one of several possible PHY-layer data rates, termed herein as "Case C", provides greater flexibility and typically exhibits higher efficiency of use of the radio medium than frame aggregation for Cases A and B. Higher efficiency of use of the radio medium occurs since as all frames might be sent on their optimum data rates at any given time.

In accordance with the exemplary embodiments of the present invention, frame aggregation might be logically located in relation to the PHY and MAC layers. First, frame aggregation might occur above (i.e., before operations of) the MAC layer, such as between the LLC layer and the MAC layer. Second, frame aggregation might occur below the MAC layer, such as between the MAC layer and the PHY layer, or in the PHY layer. Third, frame aggregation might occur within the MAC layer itself.

Figure 2:
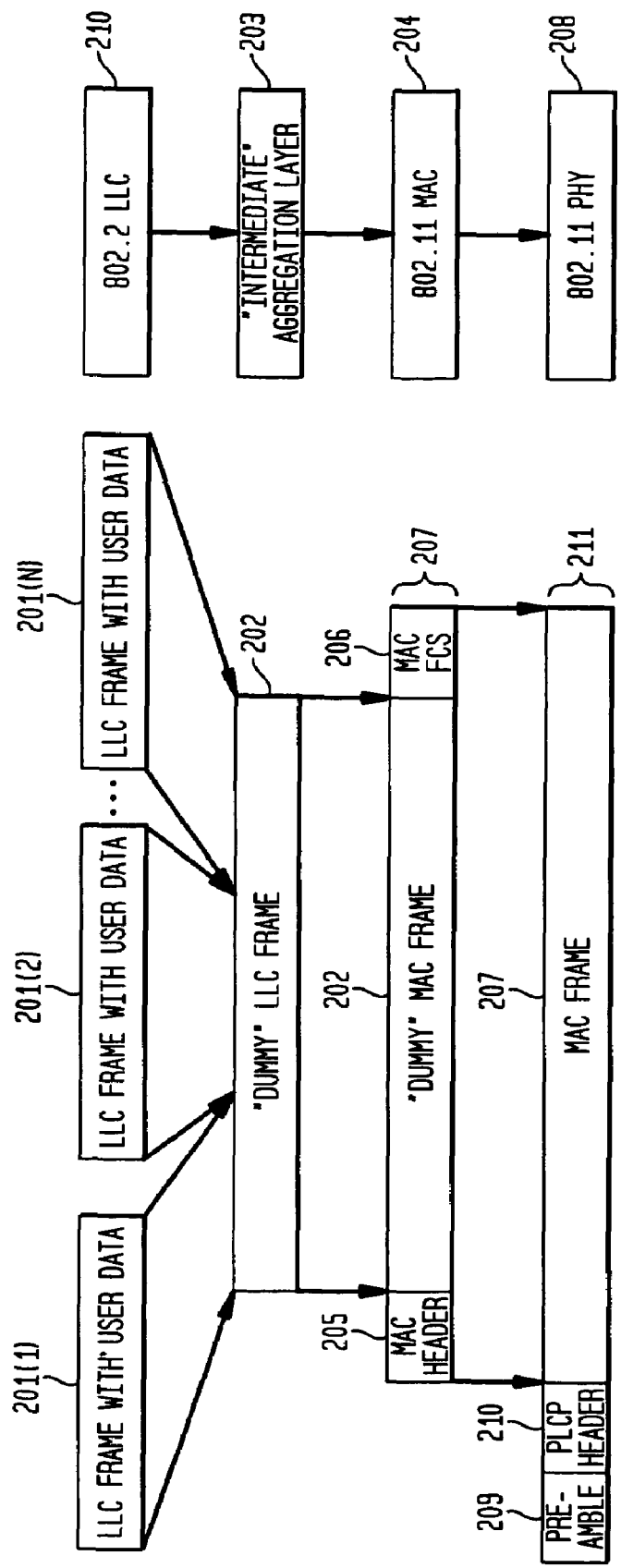
FIG. 2 shows frame aggregation above a medium access control (MAC) layer in accordance with a first exemplary embodiment.

Frame aggregation above the MAC layer involves minor modification of the operation of the MAC and PHY layers and might be accomplished by, for example, updating software drivers currently existing in network equipment. An 'intermediate layer' might be logically implemented in existing network equipment to perform frame aggregation, involving little or no change to the operation of the MAC layer and the LLC layer. For example, as shown in FIG. 2, LLC frames 201(1) through 201(N), N a positive integer, at LLC layer 210, might be combined into dummy LLC frame 202 by intermediate aggregation layer 203. Dummy LLC frame 202 is passed to MAC layer 204, which appends MAC header 205 and MAC-layer FCS 206 to form MAC frame 207. PHY layer 208 forms PHY packet 211 from MAC frame 207 by appending preamble 209 and PLCP header 210.

Figure 3:
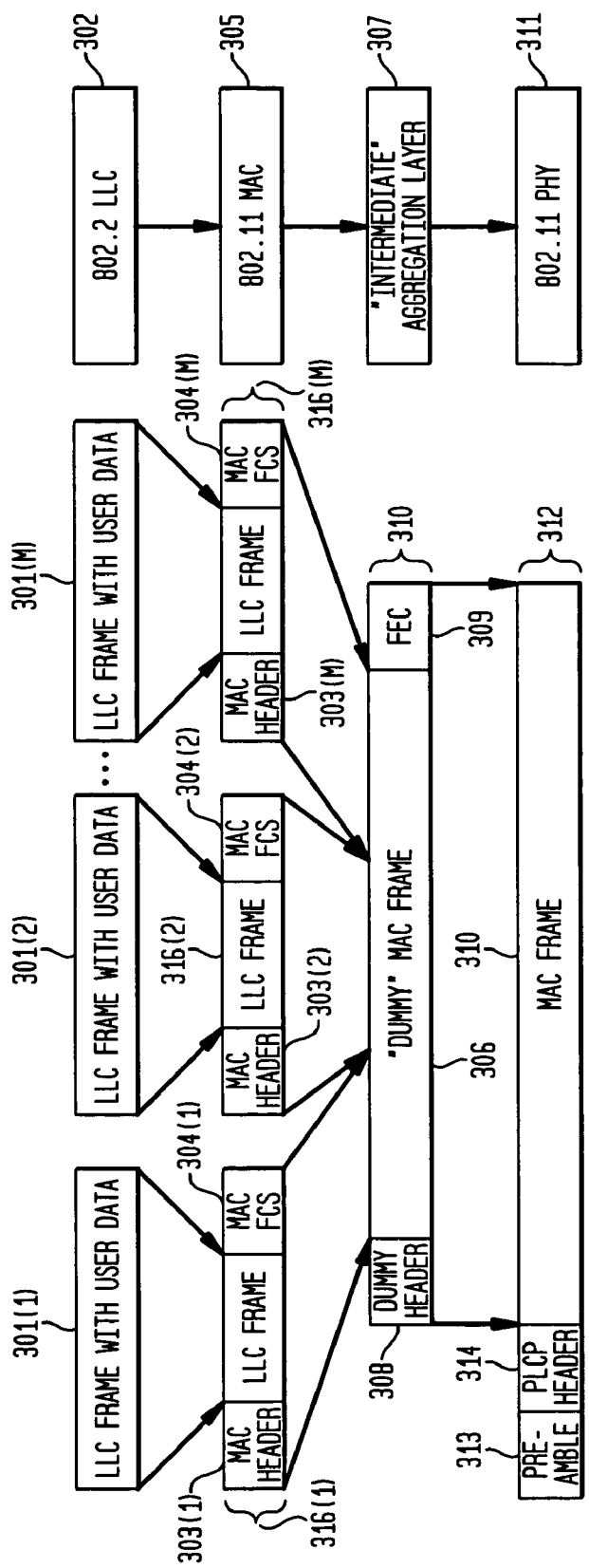
FIG. 3 shows frame aggregation below the MAC layer in accordance with a second exemplary embodiment.

Frame aggregation below the MAC layer forms several MAC frames into a dummy MAC frame before it is packetized by the PHY layer. Frame aggregation below the MAC layer enables verification of each LLC frame independently of the other frames since each MAC frame has error-detection information, such as a frame checksum, in an error-control field, such as an FCS field, appended to the LLC frame. Current 802.11-compliant WLAN systems support error-detection on the MAC level, but not necessarily error correction. However, one skilled in the art might employ any one of a number of error correction methods known in the art, instead of simple error detection. Consequently, the exemplary embodiments described herein employ the term error correction/detection to identify that either i) an error detection or ii) an error detection and correction function is employed. Also, since separate MAC frames are each sent with their own header and destination address information, the MAC frames can be sent to different destinations. FIG. 3 shows frame aggregation below the MAC layer in accordance with a second exemplary embodiment of the present invention.

LLC frames 301(1) through 301(M), M a positive integer, at LLC layer 302, are passed to MAC layer 305. Each LLC frame 301(n) is formed into MAC sub-frame 316(n) by appending MAC header 303(n) and MAC FCS 304(n). MAC sub-frames 316(1) through 316(M) are combined into dummy MAC frame 306. Intermediate aggregation layer 307 then appends optional i) dummy header 308 and/or ii) forward error correction/detection (FEC) field 309 to dummy MAC frame 306 to form aggregate MAC frame 310. PHY layer 311 forms PHY packet 312 from aggregate MAC frame 310 by appending preamble 313 and PLCP header 314.

In FIG. 3, optional dummy header 308 and FEC field 309 are shown. Dummy header 308 might be employed to indicate the number (e.g., M) and size (i.e., length) of MAC sub-frames 316(1) through 316(M) included in dummy MAC frame 306. FEC field 309 might be employed to correct bit errors at the receiver to increase the probability of correct reception of any of MAC sub-frames 316(1) through 316(M). Alternatively, multiple FEC fields might be employed, either appended at one end of dummy MAC frame 306 or within each of MAC frames 316(1) through 316(M). When different MAC sub-frames have different destinations, a modified acknowledgment method (e.g., delayed-ACK message exchange) might be employed.

Figure 4:
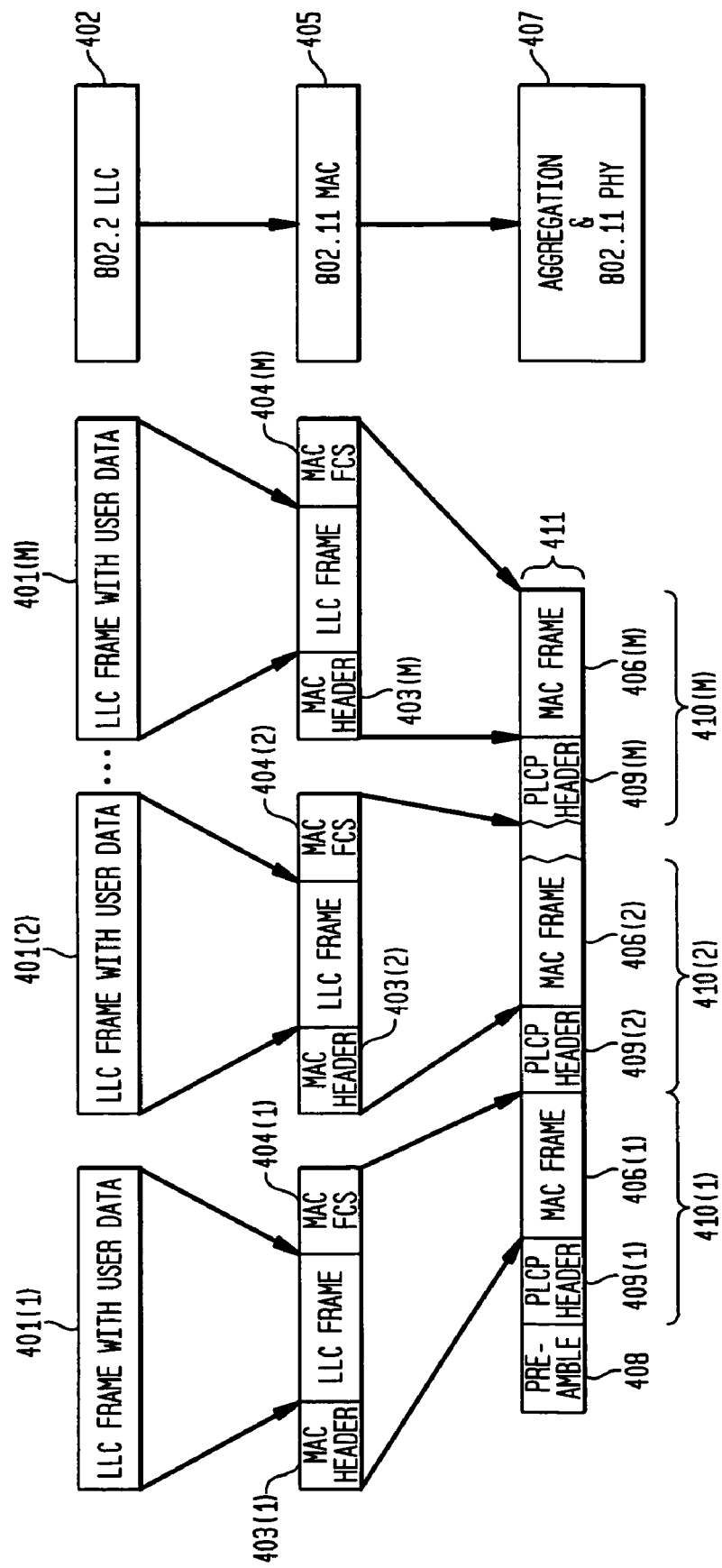
FIG. 4 shows frame aggregation below the MAC layer in accordance with an alternative to the second exemplary embodiment.

FIG. 4 shows frame aggregation within the PHY layer in accordance with an alternative to the second exemplary embodiment of the present invention. LLC frames 401(1) through 401(M) of LLC layer 402 are passed to MAC layer 405. MAC layer 405 appends MAC header 403(n) and MAC FCS 404(n) to LLC frame 401(n) to form MAC sub-frame 406(n). MAC sub-frames 406(1) through 406(M) are then passed to PHY layer 407. PHY layer 407 appends PCLP header 409(n) to each corresponding MAC sub-frame 406(n) to form PHY sub-frame 410(n). PHY sub-frames 410(1) through 410(M) are concatenated and preamble 408 is appended to the concatenated PHY sub-frames to form PHY packet 411.

As shown in FIG. 4, multiple PHY frames are concatenated without duplicating the preamble, allowing transmission of separate MAC frames with different data rates and receiving each MAC frame independently. For some implementations of the embodiment of FIG. 4, the included MAC frames might be ordered in accordance with increasing data rate so that STAs having relatively poor channel conditions can correctly receive the lower data rates.

Frame aggregation within the MAC layer integrates frame aggregation of the present invention with existing MAC-layer operation, and allows relatively great flexibility. Frame aggregation within the MAC layer also allows for detection of the separate MAC frames. Frame aggregation within the MAC layer might include a MAC aggregation-frame format in accordance with the present invention. Such MAC aggregation-frame format imbeds several higher-layer data frames in a manner such that the higher-layer data frames can be received and decoded independently, allowing for transmission of the higher-layer data frames to different destination receivers. Furthermore, since the MAC layer controls the operation of the PHY layer, portions of the aggregated frame can be transmitted on different PHY data rates to allow each frame to be sent at its desired data rate.

Figure 5:
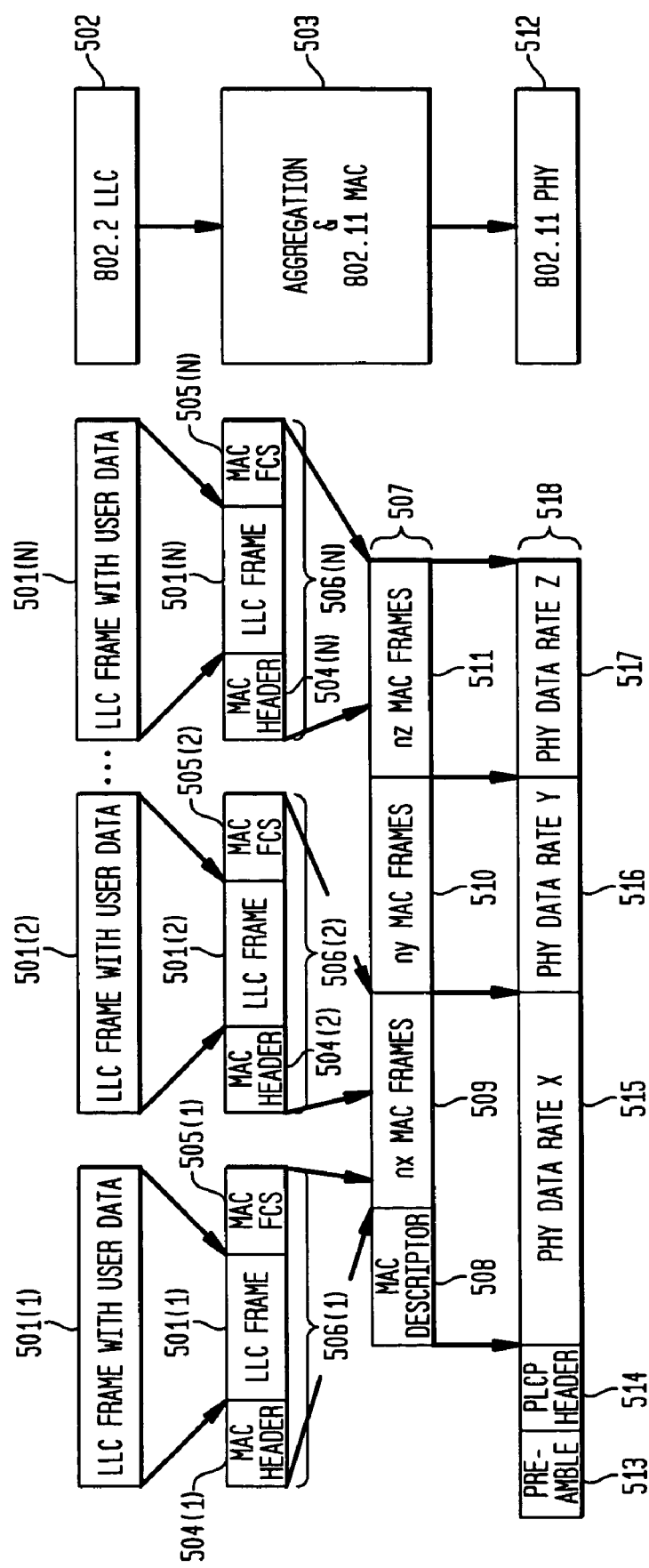
FIG. 5 shows frame aggregation within the MAC layer in accordance with a third exemplary embodiment.

FIG. 5 shows frame aggregation within the MAC layer in accordance with a third exemplary embodiment of the present invention. LLC layer 502 generates LLC frames 501(1) through 501(N), which are passed to MAC layer 503. MAC layer 503 comprises two operations: a first operation generates MAC sub-frames 506(1) through 506(N) from LLC frames 501(1) through 501(N), and a second operation generates MAC frame 507 from MAC sub-frames 506(1) through 506(N). MAC sub-frame 506($n$) is generated by appending corresponding MAC header 504($n$) and MAC FCS 505($n$), in accordance with one or more IEEE 802.11 standards.

MAC frame 507 might be formed by grouping MAC sub-frames 506(1) through 506(N) according to data rate, and then prepending MAC descriptor 508. MAC descriptor 508 is a field that provides index information for the remaining portions of MAC frame 507. MAC descriptor 508 might also specify the position, length, and destination of one or more of MAC sub-frames 506(1) through 506(N) within MAC frame 507. Since the destination addresses of all included MAC sub-frames 506(1) through 506(N) are located at the front of MAC frame 507, a receiver determines, by decoding MAC descriptor 508, whether one or more of the included MAC sub-frames 506(1) through 506(N) are intended for the receiver. A receiver might employ this information to suspend listening mode when no MAC sub-frames are expected, leading to more efficient operation (e.g., conserve available power).

MAC sub-frames 506(1) through 506(N) are grouped by data rate and concatenated into MAC frame portions 509, 510, and 511. As with the embodiment shown in FIG. 4, MAC sub-frames 506(1) through 506(N) are ordered with increasing data rate so that receivers with bad channel conditions may correctly receive MAC sub-frames having lower data rates. Consequently, MAC descriptor 508 is preferably transmitted with the lowest included data rate. For FIG. 5, data rate X<data rate Y<data rate Z.

MAC frame 507 is passed to PHY layer 512 which forms PHY packet 518. PHY layer 512 forms PHY packet 518 by grouping MAC descriptor 508 with MAC frame portion 509 to form PHY data rate X portion 515. MAC frame portions 510 and 511 are mapped directly to PHY data rate Y and Z portions 516 and 517, respectively. PHY data rate X, Y, and Z portions 515, 516, and 517 are concatenated and appended to preamble 513 and PLCP header 514 to generate PHY packet 518.

If the aggregate frame is sent with multiple data rates, i.e., one or more MAC frame portions are transmitted with a different data rate than others, information about which data rates are used for which parts of the frame might be conveyed in PLCP header 514. PLCP header 514 is shown located at the front of MAC frame 518 (i.e., immediately after the preamble), while alternative embodiments might locate PLCP header fields in front of the part of the MAC sub-frame(s) that the PLCP header field describes, such as immediately before each of PHY data rate X, Y, and Z portions 515, 516, and 517.

Figure 6:
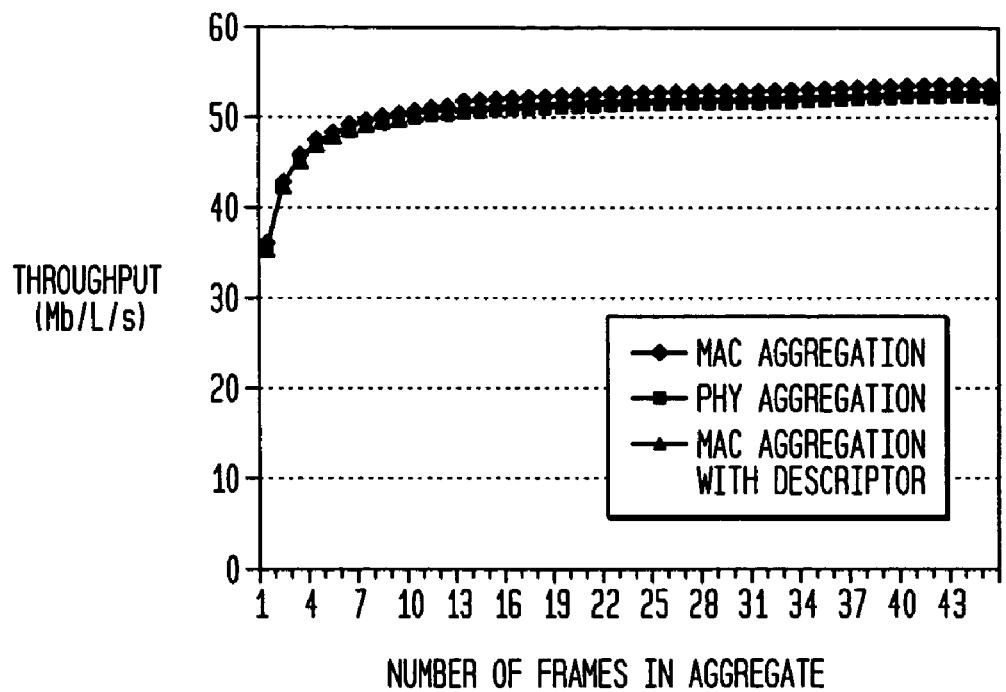
FIG. 6 illustrates maximum throughput versus number of frames in aggregate for a 54-Mbit/s physical-(PHY-) layer data rate.
Figure 7:
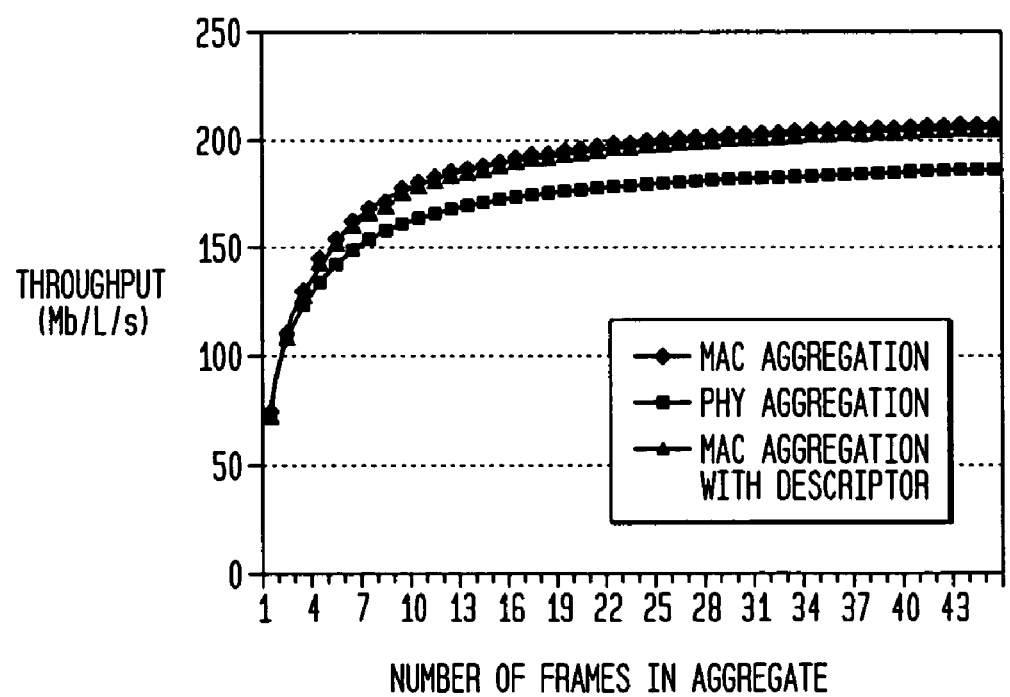
FIG. 7 illustrates maximum throughput versus number of frames in aggregate for a 216-Mbits/s PHY-layer data rate.
Figure 8:
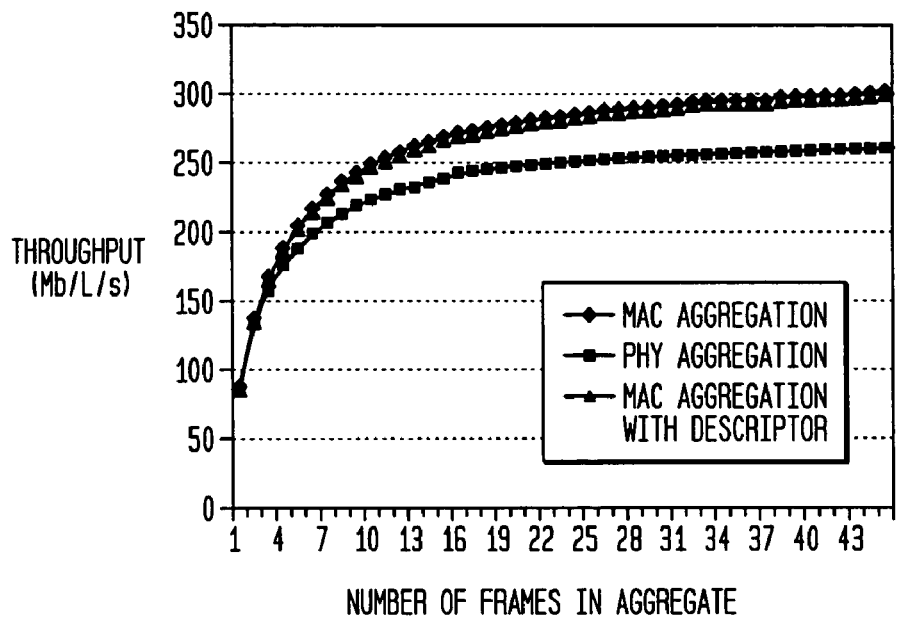
FIG. 8 illustrates maximum throughput versus number of frames in aggregate for a 324-Mbits/s PHY-layer data rate.

Operation of the exemplary embodiments of FIGS. 2 through 5 might be simulated via computer, and performance, measured as medium efficiency, of the exemplary embodiments illustrated for varying conditions. Medium efficiency is illustrated in FIGS. 6 through 8 by comparison of maximum achievable throughput under relatively ideal conditions in a point-to-point link. Conditions employed in the simulation are that: i) every exchange sequence consists of one aggregated frame followed by one regular ACK frame (not a Block-ACK); ii) all data frames that are included in one aggregated frame are sent on the same data rate (e.g., 54-, 216-, and 324-Mbit/s) and all data frames are 1500 bytes large; iii) the ACK frames are sent on 54 Mbit/s, with regular 802.11a preamble and PLCP header and timing (short interframe space (SIFS), distributed interframe space (DIFS) and slot time) equivalent to the values defined in 802.11a; iv) contention is chosen to be the 'optimum' value of one slot for every frame exchange; and v) there are no collisions and bit/packet errors.

FIGS. 6, 7, and 8 illustrate maximum throughput versus number of frames in aggregate for 54-Mbit/s, 216-Mbits/s, and 324-Mbits/s PHY-layer data rates, respectively. Each of FIGS. 6, 7, and 8 illustrates maximum throughput for the embodiments shown in FIG. 3 (MAC-layer aggregation shown with solid diamonds), FIG. 4 (PHY-layer aggregation shown with solid squares), and FIG. 5 (MAC-layer aggregation with MAC (frame) descriptor shown with dotted triangles).

For the MAC layer aggregation of FIG. 3, all included MAC sub-frames are concatenated one after the other, without any additional protection fields, frame descriptor, or PLCP headers. For the simulation, the dummy header and FEC fields were not employed. The used aggregation format represents a single destination frame aggregation of Case A. For the PHY-layer aggregation of FIG. 4, the simulation represents frame aggregation for multiple data rates of Case C, since all included MAC sub-frames are sent at their own data rate. In each of the FIGS. 6 through 8 only one data rate is actually used. The MAC-layer aggregation with frame descriptor of FIG. 5 represents aggregation with only one data rate and with multiple destinations (that, therefore, necessarily use the same data rate) of Case B. In each of the simulations of FIGS. 6 through 8, only one destination is used.

The simulation results illustrated in FIGS. 6, 7, and 8 indicate that maximum throughput increases when more higher-layer frames are combined in one aggregated frame. Also, maximum throughput is relatively low if only a few higher-layer frames can be aggregated, especially for higher PHY-layer data rates.

An aggregation method that allows for aggregation of frames with different destination stations has a higher possibility of reaching a desired throughput because it is more likely to have frames available for aggregation. Aggregation methods that allow different parts of the frame to be sent having different data rates are more likely to reach high medium efficiency, because these methods allow the aggregated frames to be sent to stations with completely different channel conditions, again increasing the possibility of having a large number of frames available for aggregation.

The achievable maximum throughput depends on the number of frames that are available for aggregation. Frame aggregation with multiple-destination frames increases the number of frames available for aggregation. However, for 802.11 WLAN applications, an AP of a BSS typically transmits to multiple STAs, while an STA typically only transmits to one or two APs. Consequently, this type of frame aggregation with multiple destinations might typically be employed for an AP transmitting to STAs.

Thus, uplink traffic from an STA to APs might employ a relatively simple method of frame aggregation, allowing only frames with one destination (and as a result one PHY-layer data rate) to be aggregated in one frame.

FIGS. 9 through 12 illustrate maximum throughput for several different configurations in a BSS simulated with a number of active STAs. For the simulation results of FIGS. 9 through 12, the STAs operate in different channel condition regions so that the STAs operate with different data rates. The AP transmits data frames to each of the active STAs, with data frames of 1500 bytes. Each station has a number of downlink connections, and per connection the AP has a certain number of frames per exchange sequence. The data frames, as well as the MAC-layer acknowledgments are transmitted with a PHY-layer frame format similar to that of 802.11a, but with an extended preamble (+10 μs) and extended PLCP header (+4 μs). Each sequence uses three back-off slots for its contention. Each station replies (uplink) with one TCP acknowledgment (60-byte size) per connection per sequence. Bit/packet errors and/or collisions are not considered. The data rate on which immediate ACK frames are sent is (1/2.25) times the data rate of the corresponding data frame. Block-ACK messages and Block-ACK request messages are sent at the same data rate as the corresponding data frame.

In FIGS. 9 through 12, seven simulated and compared aggregation methods are as follows.

A first method employs no aggregation (i.e., every PHY-layer packet frame contains one single MAC frame), in accordance with the current 802.11 standards. The method employs a standard immediate ACK message, sent an SIFS period after each data frame, for both uplink and downlink transmissions.

A second method employs single destination aggregation with an aggregated immediate ACK message, which is an extended version of the standard immediate ACK message. For the second method, the AP combines all data frames for a single station in one aggregated frame. The STA replies after an SIFS period with an aggregated immediate ACK message. The uplink channel (TCP-ACKs) employs data frames without aggregation, and the AP replies with a standard immediate ACK message.

The third method employs single-destination aggregation with Block-ACK messages in both uplink and downlink transmission directions. Block-ACK and Block-ACK request messages, as specified by 802.11e, are included in the aggregated frames in both uplink and downlink directions.

The fourth method employs single PHY data rate aggregation, where the uplink uses aggregated immediate ACK messages, the downlink uses Block-ACK messages. For the fourth method, the AP combines all data frames for STAs having the same PHY-layer data rate into one aggregate frame (with multiple destinations).

The fifth method employs single-rate aggregation in a manner similar to that of the fourth method, but with delayed Block-ACK messages in both uplink and downlink transmission directions. In both directions, Block-ACK request and Block-ACK messages are included in the aggregated frames.

The sixth method employs multi-rate aggregation, where the uplink channel uses aggregated immediate ACK messages and the downlink channel uses Block-ACK messages.

For the sixth method, the AP combines frames for all PHY-layer data rates into one aggregate frame using the format of FIG. 5. An additional PLCP header is included per data rate to allow for data-rate switching (PLCP headers are included only per rate, rather than per frame).

The seventh method employs multi-rate aggregation similar to that of the sixth method, but with delayed Block-ACK messages in both uplink and downlink channels directions.

Figure 9:
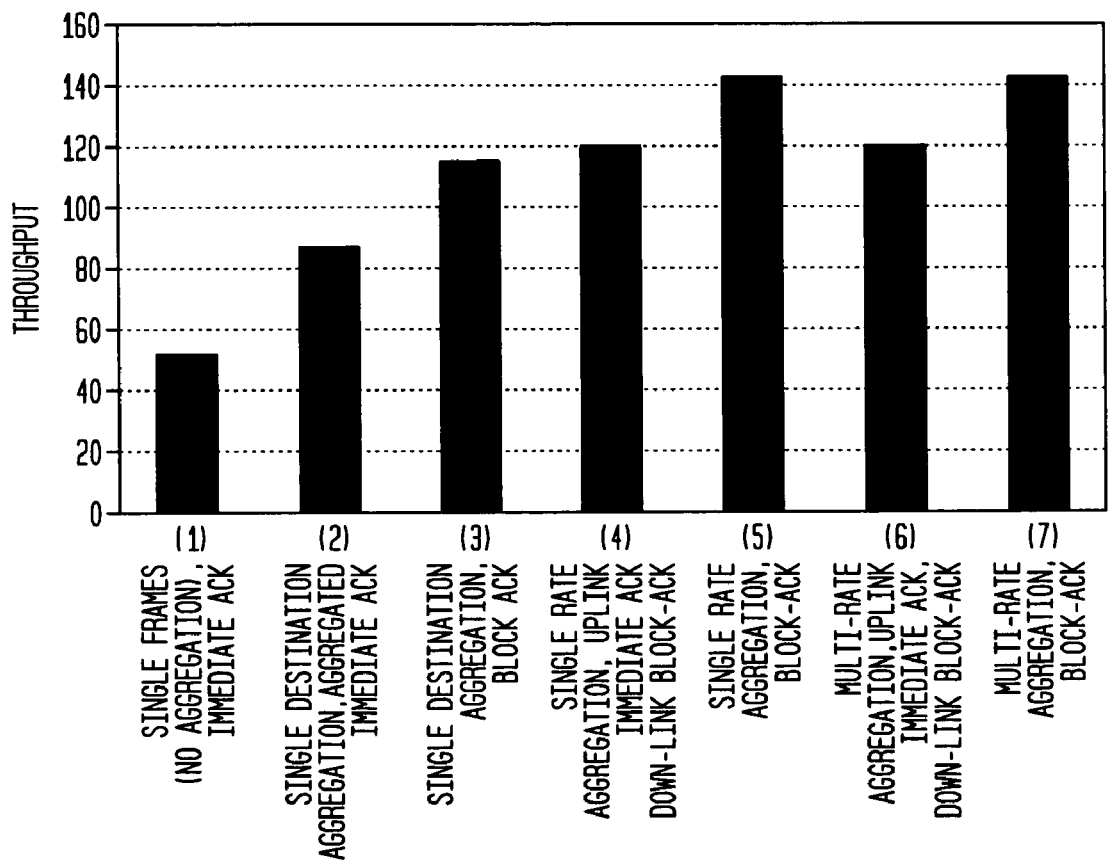
FIG. 9 illustrates maximum throughput for various aggregation methods for a basic service set (BSS) simulated with three stations (STAs) operating with a 324-Mbit/s PHY layer data rate.

FIG. 9 shows simulation results for a BSS with three STAs that each operates with the same PHY-layer data rate of 324 Mbit/s for data frames and 144 Mbit/s for immediate ACK message frames. Each STA has one TCP connection with three frames per connection per aggregated frame (i.e., the AP sends three frames to every station during every cycle). Each STA replies with one TCP ACK message frame per cycle (i.e. one ACK per three downlink frames).

Figure 10:
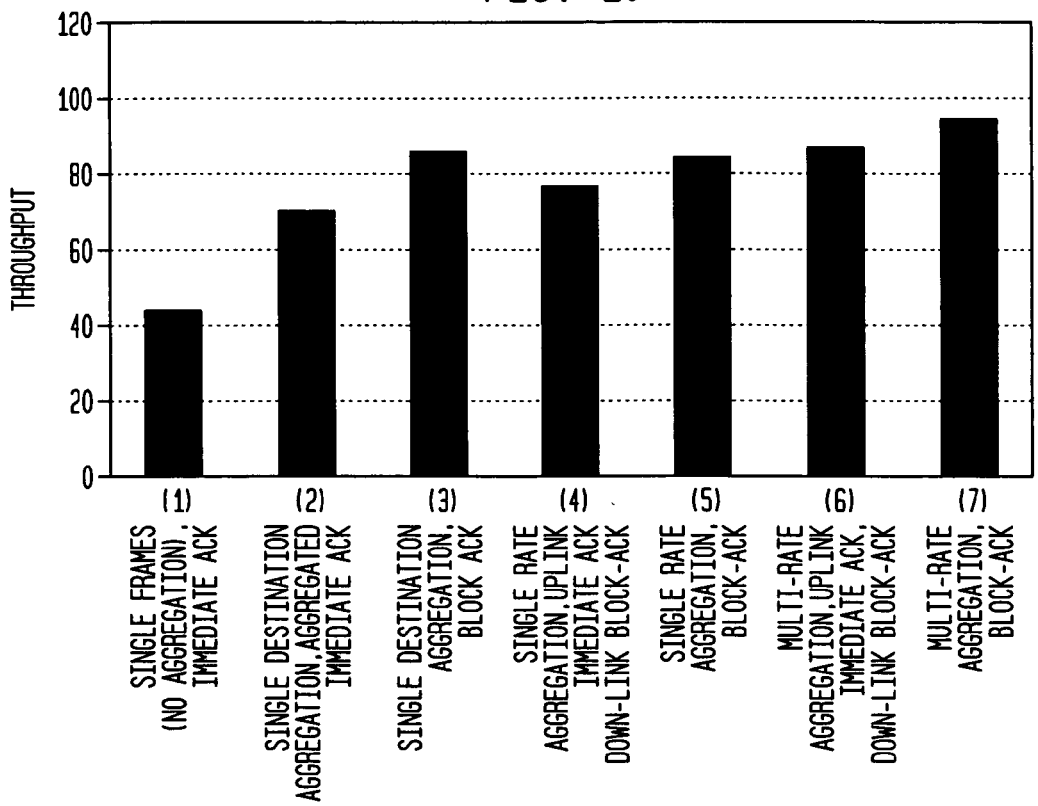
FIG. 10 illustrates maximum throughput for various aggregation methods for a BSS simulated with three STAs operating with 324-, 216-, and 108-Mbit/s PHY layer data rates, respectively.

FIG. 10 shows simulation results for the configuration of FIG. 9 except that each STA operates with a different PHY-layer data rate. Thus, one STA operates on 324 Mbit/s (ACK message rate of 144 Mbit/s), one STA operates on 216 Mbit/s (ACK message rate of 96 Mbit/s), and one STA operates on 108 Mbit/s (ACK message rate of 48 Mbit/s).

Figure 11:
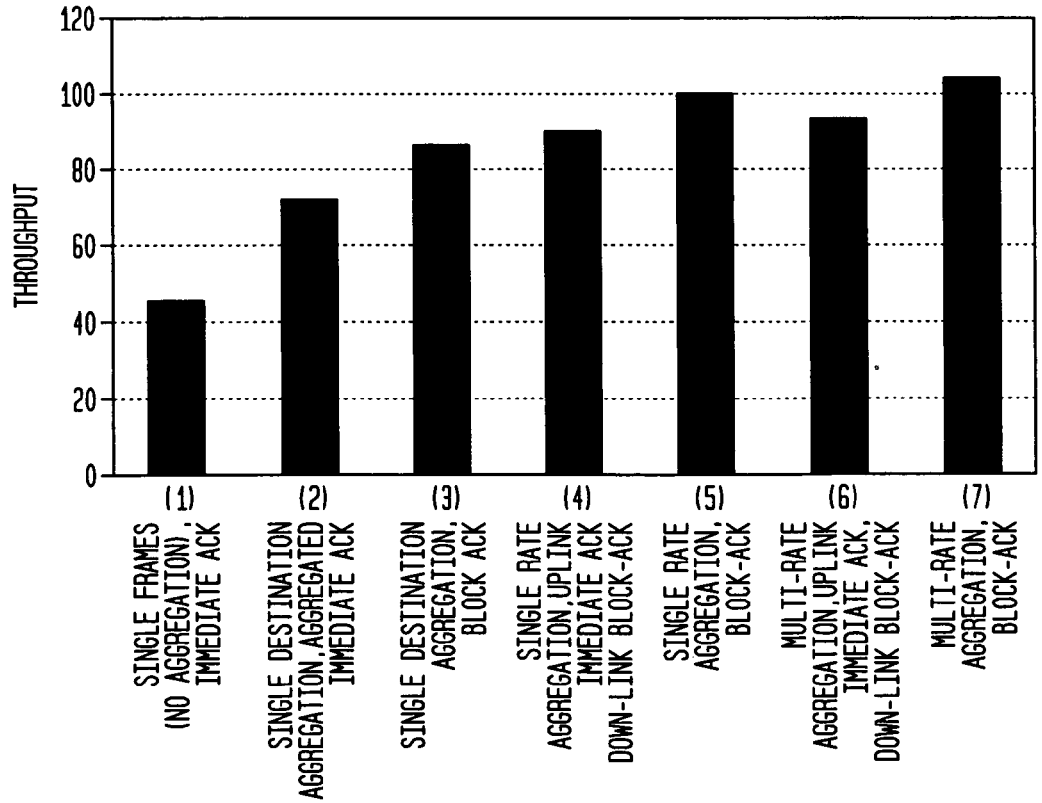
FIG. 11 illustrates maximum throughput for various aggregation methods for a BSS simulated with three STAs operating with a 324 Mbit/s PHY layer data rate, three STAs operating with a 216 Mbit/s PHY layer data rate, and three STAs operating with a 108 Mbit/s PHY layer data rate.

FIG. 11 shows simulation results for the configuration of FIG. 10, except that there are nine STAs with three STAs operating with each of the PHY-layer data rates.

Figure 12:
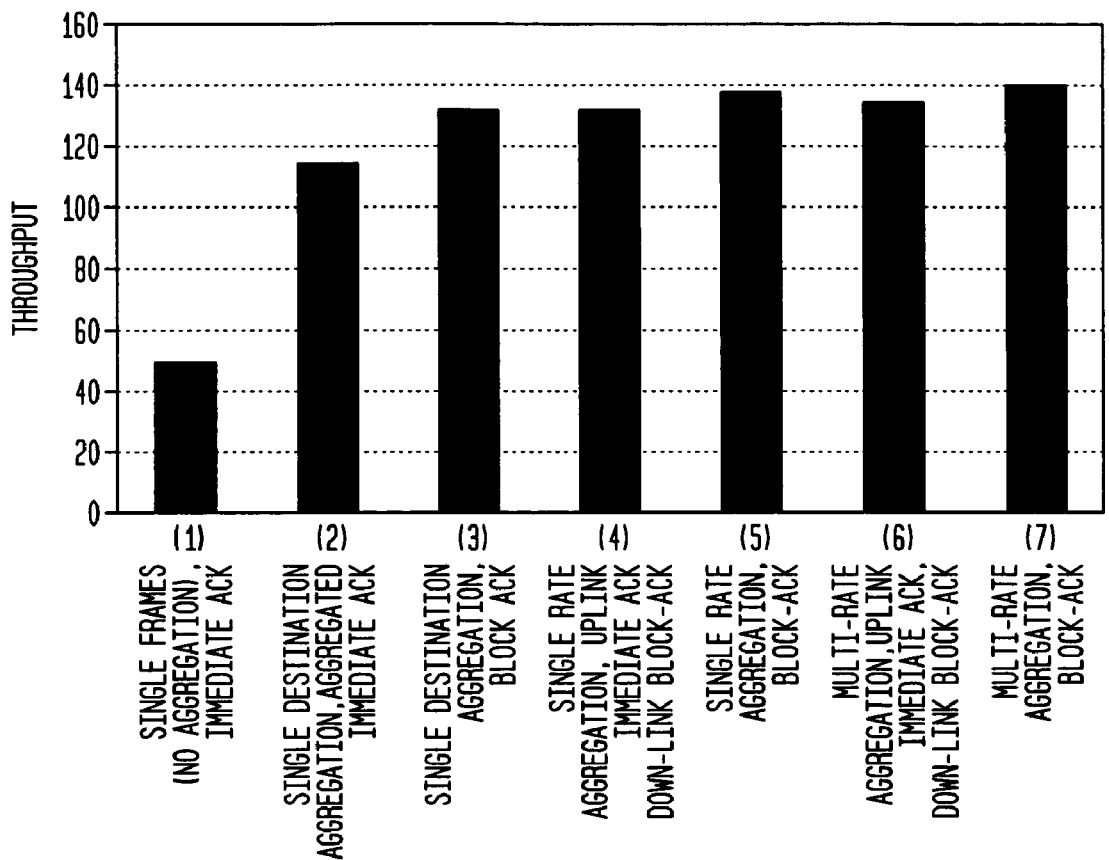
FIG. 12 illustrates maximum throughput for various aggregation methods for a BSS simulated as shown in FIG. 11 but with three connections per STA.

FIG. 12 shows simulation results for the configuration of FIG. 11, but each STA supports three connections so that the AP has nine frames per station per cycle.

As shown in FIGS. 9-12, frame aggregation provides moderate to significant improvement in system performance under varying channel conditions.

In accordance with the present invention, an exemplary aggregation frame format is now described, the aggregation frame format allowing for aggregation of multiple frames for multiple destinations. While the exemplary aggregation frame format is described with respect to frames having the same PHY layer data rate, one skilled in the art might extend the teachings herein to frame aggregation formats for multiple destinations and including multiple data rates, such as for the exemplary third embodiment shown in FIG. 5.

The exemplary aggregation frame format described herein allows for interoperability, for example, for 802.11-compliant devices that co-exist in a network with devices that employ frame aggregation. Even though the PHY-layer data rates described herein are data rates higher than 54-Mbit/s, the exemplary aggregation frame format might also be used on lower rates (e.g., 802.11a or 802.11g standard data rates), and as such might be compatible with existing MAC-layer implementations.

In order to achieve the highest medium efficiency as possible, the exemplary aggregation frame format allows all types of MAC frames to be aggregated into one PHY frame, including data frames for different destinations, (Block-)ACK frames, and management frames. Power-efficient operation might be achieved when the destination addresses of the MAC frames are all located at the start of a PHY frame (i.e., in close vicinity to the PLCP header). To reduce the total listening time by a receiving device (e.g., STA), the destination addresses are ordered such that the destination addresses for which the most frames are included are at the end of the frame.

To increase probability of correct detection of (at least part of) the aggregate frame, the number of fields in the aggregate frame that provide an offset into the aggregate frame (e.g., the field indicating the length of a MAC sub-frame) is relatively small. In addition, the negative effects from a bit error or a packet error are preferably not be increased by a larger number of included MAC sub-frames or a larger total length of the frame.

Figure 13:
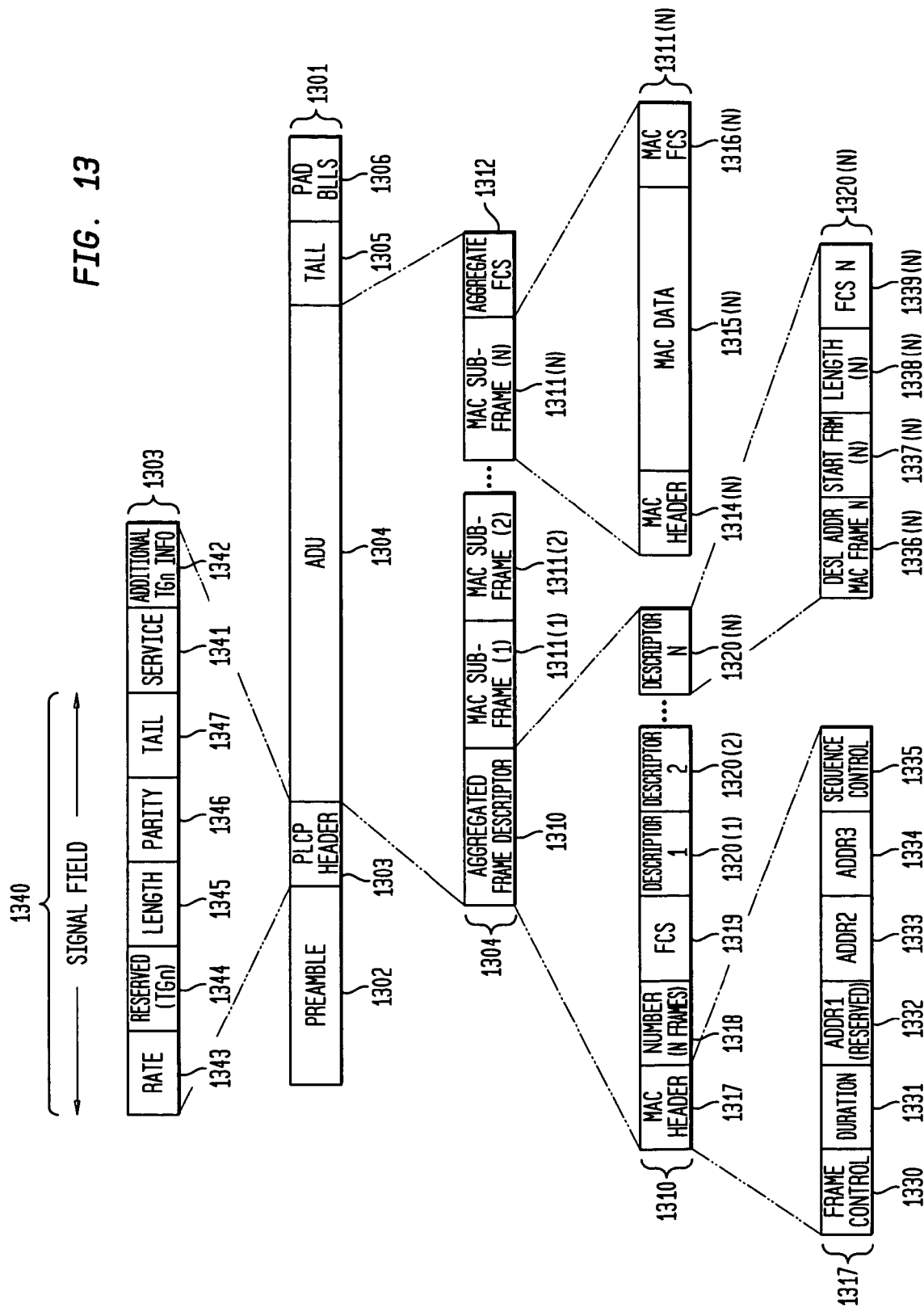
FIG. 13 shows an exemplary aggregated frame format in accordance with the described embodiments.

FIG. 13 shows an exemplary aggregated frame format for PHY-layer packet 1301. Packet 1301 comprises preamble 1302, PLCP header 1303, aggregate data unit (ADU) 1304, tail field 1305, and optional pad bits 1306. Aggregate data unit (ADU) 1304 might also be termed a PLCP service data unit (PSDU). The aggregated frame format of FIG. 13 might be employed for PHY-layer packets generated in accordance with the third exemplary embodiment of FIG. 5. Preamble 1302 is a pattern employed for packet detection in accordance with, for example, the 802.11 standard. Preamble 1302 might be employed for synchronization to determine radio gain and to establish clear channel assessment. Tail field 1305 is a 6-bit pattern indicating the end of PHY-layer packet 1301, which might be employed to reset a receiver's Viterbi decoder. Optional pad bits 1306 might be employed to make the length of PHY-layer packet 1301 conform to a predetermined value for transmission.

PLCP header 1303 comprises signal field 1340, service field 1341, and optional reserved field 1342. Signal field 1340 includes rate field 1343, optional reserved field 1344, length field 1345, parity field 1346, and tail 1347. Rate field 1343 is employed to specify the rate at which the payload is transmitted. Reserved field 1344 in the signal field 1340 might be employed to indicate use of an aggregated frame in addition to or separate from aggregated frame descriptor 1310 (described subsequently), but might be employed for other applications. Length field 1345 specifies the length (in bits) of the ensuing payload. Parity field 1346 contains an error correction/detection value (e.g., parity check value) employed to verify the bits of PLCP header 1303. Tail field 1347 indicates the end of signal field 1340, and also might be employed to reset the receiver's Viterbi decoder. Service field 1341 is a currently reserved field, and might be employed to reset a transmitter's scrambler in the 802.11 standard. Optional reserved field 1342 is reserved for additional TGn information (TGn, or Task Group n, is a group whose members study and adopt specifications for 802.11 n systems), such as additional PLCP information and/or additional preamble structures.

ADU 1304 comprises aggregated frame descriptor 1310 and aggregated MAC sub-frames 1311(1) through 1311(N) and optional aggregate FCS 1312. MAC sub-frame 1311(n) comprises MAC (frame) header 1314(n) and MAC FCS 1316(n) appended to MAC data 1315(n), where MAC data 1315(n) might be the nth aggregated IP frame from the LLC layer. MAC header 1314(n) and MAC FCS 1316(n) might be MAC header and MAC frame checksum generated in accordance with one or more 802.11 standards. MAC sub-frames 1311(1) through 1311(N) might be arranged in ascending order of PHY-layer data rate or in groups corresponding to selected data rates, and data-rate groups themselves might be ordered in ascending order of PHY data rate.

Aggregated frame descriptor 1310 comprises MAC (aggregated frame) header 1317, frame number field 1318, (aggregated frame) FCS 1319, and descriptors 1320(1) through 1320(N). Aggregated frame descriptor 1310 is typically located at the front of ADU 1304 and indicates, via MAC header 1317, that PHY-layer packet 1301 is an aggregated frame.

Figure 14:
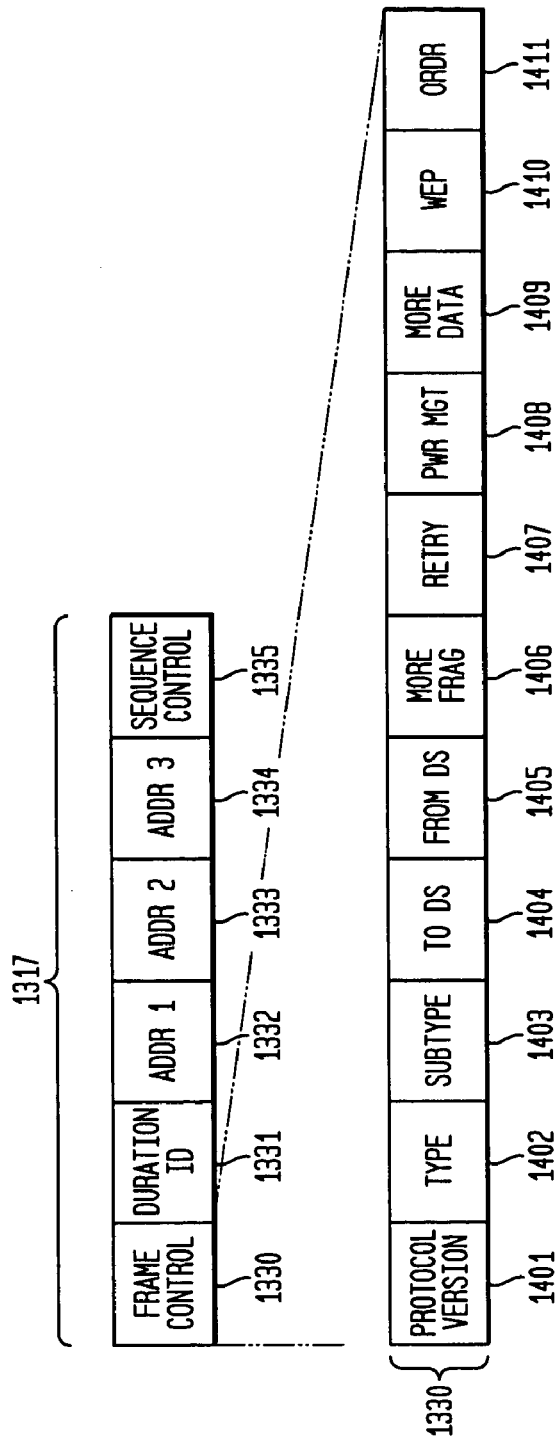
FIG. 14 shows the MAC header format as employed by the exemplary aggregated frame descriptor of FIG. 13.

MAC header 1317 comprises frame control field 1330, duration 1331, address field 1 (ADDR1) 1332, address field 2 (ADDR2) 1333, address field 3 (ADDR3) 1334, and sequence control field 1335. FIG. 14 shows MAC header 1317 as employed by the exemplary aggregated frame format of FIG. 13. As shown in FIG. 14, frame control field 1330 comprises protocol version field 1401, type field 1402, subtype field 1403, ToDS field 1404, FromDS field 1405, MoreFrag field 1406, Retry field 1407, Pwr Mgt field 1408, More Data field 1409, WEP field 1410, and Ordr field 1411.

Protocol version field 1401 is 2 bits in length and indicates the version of the 802.11 standard employed for PHY-layer packet 1301. Type field 1402 and subtype field 1403 are 2 and 4 bits in length, respectively, and are employed to specify the type of aggregate frame 1304. Such indication might be implemented as either a new value for the protocol version (e.g., 01) or as a new frame (sub-) type (e.g., type 00 (indicates management frame) with subtype 1111 (indicates aggregated frame descriptor) or type 11 with subtype 0000). Alternatively, such indication might be implemented as an existing protocol version and frame type, but with a special destination address (e.g., a multi-cast address could be used or the destination address of the frame descriptor is set to the address of the originator of the frame.

The remaining ToDS field 1404, FromDS field 1405, MoreFrag field 1406, Retry field 1407, Pwr Mgt field 1408, More Data field 1409, WEP field 1410, and order field 1411 are all 1 bit in length. ToDS field 1404 and FromDS field 1405 indicate communication with a distribution system (DS). More Frag field 1406 indicates a following fragment of the current ADU 1304 and is set to 0 in the preferred embodiment. Retry field 1407 indicates a re-transmission and is set to 0 in the preferred embodiment. PwrMgt (Power Management) field 1408 indicates if a STA is in power save mode (set to 1) or active mode (set to 0). More Data field 1409 is set to 1 if any ADUs are buffered for that station. Wired equivalent privacy (WEP) field 1410 is set to 1 if the information in the frame body was processed with the WEP algorithm specified in the 802.11 standard. Ordr (Order) field 1411 is set to 1 if the frames must be strictly ordered to maintain the transmitted sequence that is passed to higher levels.

Returning to FIG. 13, duration field 1331 is 2 bytes in length and contains the duration value for each field, the NAV setting, and the associated identity of the transmitting station. Address fields ADDR1 1332, ADDR2 1333, and ADDR3 1334 are each 6 bytes in length and identify the BSS, the destination address, the source address, and the receiver and transmitter addresses. Sequence control field 1335 is 2 bytes in length and is split into 2 sub-fields (not shown in FIG. 13): fragment number and sequence number. The fragment number is 4 bits in length and indicates how many fragments the ADU is broken into. The sequence number field is 12 bits in length and indicates the sequence number of the ADU. Sequence control field 1335 is restricted in accordance with the exemplary aggregated frame format and both the sequence and fragment number fields are set to 0. Number field 1318 identifies the number N of MAC sub-frames 1311(1) through 1311(N) inside the aggregate frame, and the value of FCS field 1319 is a checksum value for the aggregated frame descriptor 1310 (e.g., the checksum over the first 24+2 bytes).

Figure 15:
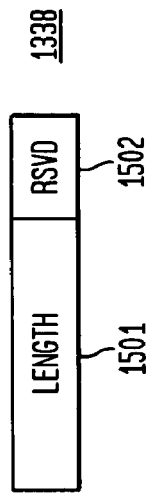
FIG. 15 shows an exemplary format of the MAC-layer length fields of FIG. 13.

After FCS field 1319 follows descriptor fields 1320(1) through 1320(N), each for an associated one of MAC sub-frames 1311(1) through 1311(N). Descriptor field 1320(n) contains destination MAC (Dest Addr) field 1336(n) identifying the receiving device for which MAC sub-frame 1311(n) is intended, start of frame (start frm) field 1337 which identifies the start position in ADU 1304 of MAC sub-frame 1311(n), length of frame (length frm) field 1338(n) which identifies the length of MAC sub-frame 1311(n), and FCS field 1339(n) which is a CRC value for descriptor field 1320(n). An exemplary format for length frm field 1338(n) is shown in FIG. 15. Length field 1501 of 12 bits indicates the length of a MAC sub-frame, and reserved (rsvd) field 1502 comprises four bit positions reserved for future use. Since each descriptor field and each MAC sub-frame has its own FCS field, the possibility of MAC packet errors is not related to the number of aggregated frames.

MAC sub-frame 1311(n) comprises MAC header 1314(n), MAC data 1315(n), and MAC FCS 1316(n). MAC header 1314(n) might be a MAC header in accordance with an 802.11 standard without frame aggregation except the value of the duration field (not shown in FIG. 13) is set to the same value as that of duration field 1331 of aggregated frame descriptor 1310. Also, for some embodiments, the Quality of Service (QoS) header extensions may be restricted (e.g., request for immediate ACK is not allowed). MAC data 1315(n) is the payload of MAC sub-frame 1311(n), which may be an IP packet or LLC frame, and MAC FCS 1316(n) is a CRC value calculated over MAC header 1314(n) and MAC data 1315(n) of MAC sub-frame 1311(n).

The optional aggregate FCS field 1312 contains a checksum value for entire ADU 1304. The optional aggregate FCS field 1312 might be included if backward-compatibility is required. The optional aggregate FCS field 1312 might be used by devices that do not support the aggregated format to detect, and possibly correct, errors in the incoming ADU. Devices that do support the aggregated frame format shall discard the aggregate FCS field.

After forming a packet having the exemplary aggregated format, a sending device (e.g., the STA or AP) transmits the PHY-layer packet through the wireless medium, where the PHY-layer packet is detected by a receiving device (e.g., the AP or STA). Since i) the receiving device may or may not support an embodiment of frame aggregation, ii) the receiving device may or may not be the intended destination, and iii) the received PHY layer packet might contain one or more errors, the receiving device might perform one or more of the following operations upon detection of the packet having the aggregated frame format.

Figure 16:
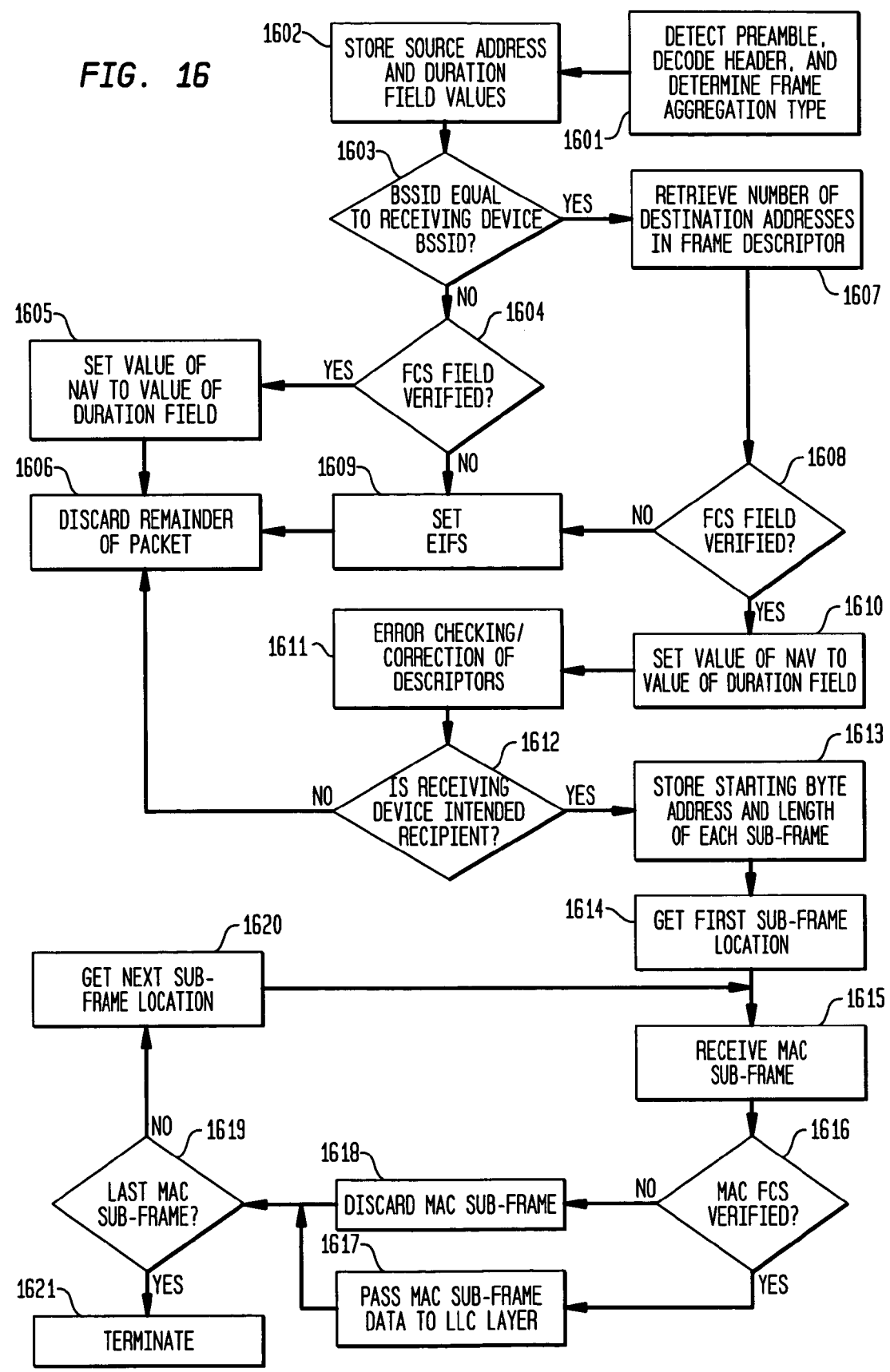
FIG. 16 shows an exemplary method of reception where the receiving device supports frame aggregation.

FIG. 16 shows an exemplary method of reception where the receiving device supports frame aggregation. At step 1601, the receiving device i) detects the preamble, ii) decodes the PLCP header, and iii) determines the aggregated frame descriptor's frame control field indicates a frame aggregation type. At step 1602, the source address (Addr2) and the duration field's value are stored for later use. For some embodiments, the sequence number of the aggregate frame descriptor might also be discarded at step 1602. At step 1603, a test compares the value of BSSID in Addr3 field to that of the receiving device.

If the test of step 1603 determines that the value of BSSID in Addr3 field does not match that of the receiving device, at step 1604, a test verifies the FCS field of the first part of the aggregated frame against the CRC of the frame. If the test of step 1604 verifies the FCS field, then, at step 1605, the value of NAV (Network Allocation Vector) is set to the value of the duration field and the method advances to step 1606. If the test of step 1604 does not verify the FCS field, then, at step 1609, the extended interframe space (EIFS) is set and the method advances to step 1606. At step 1606, the rest of the aggregated frame is discarded.

If the test of step 1603 determines that the value of BSSID in Addr3 field does match that of the receiving device, then, at step 1607, the two bytes of the frame body are used to retrieve the number of destination addresses in the frame descriptor. At step 1608, a test verifies the FCS field of the first part of the aggregated frame against the CRC of the frame. If the test of step 1608 does not verify the FCS field of the first part of the aggregated frame descriptor, then, at step 1609, the EIFS is set. At step 1606, the rest of the aggregated frame is discarded. If the test of step 1607 does verify the FCS field of the first part of the aggregated frame descriptor, then at step 1610, the NAV is set to the stored value of the duration field.

At step 1611, the independent (MAC) descriptor fields are processed, one by one, in a manner described subsequently with respect to FIG. 17. At step 1611, the MAC sub-frames are checked for errors by verification of the corresponding FCS fields, and the MAC sub-frames are processed for error detection/correction, if necessary. When a receiving device detects errors during reception of a packet having an aggregated frame format, several different operations may occur. If an error is detected within the preamble or within the PLCP header, then the entire aggregated frame might be discarded. If one or more bit errors occur within a first part of the frame descriptor, then the entire aggregated frame might be discarded. If, however, the first part of the aggregated frame descriptor is valid, then all other sub-frames might be processed independently (i.e., if one or more bit errors occur in one of the descriptor fields or in one of the MAC sub-frames, only the corrupted MAC sub-frame is lost).

At step 1612, a test determines whether the receiving device is the destination of at least one of the frames in the aggregated frame from the detected destination addresses in the aggregate frame descriptor. If the test of step 1612 determines that the receiving device is not an intended destination, then the method advances to step 1606. The receiving device may, after step 1606, enter a form of power saving mode during the remainder of the ongoing transmission (e.g. not detect and decode the incoming MAC sub-frames).

If the test of step 1612 determines that the receiving device is an intended destination, then, at step 1613, the receiving device stores the starting byte and length of each of the MAC sub-frames.

At step 1614, the first sub-frame location is retrieved. At step 1615, the MAC sub-frame at the sub-frame location is retrieved and the method begins decoding the MAC sub-frames. For example, if the first and second MAC sub-frames are sent to this receiving device, the receiving device waits until the end of the frame descriptor (i.e., the end of the last descriptor field) and starts decoding the first frame. The location of the first byte of this MAC sub-frame might also be indicated by the Start field of its associated descriptor field, as described previously with respect to FIGS. 13 and 14 for an exemplary aggregated frame format.

At step 1616, a test verifies whether the FCS of the MAC sub-frame is correct. If the test of step 1616 determines that the FCS of the MAC sub-frame is correct, then, at step 1617, the MAC sub-frame data (payload or LLC frame) is passed to the LLC layer. If the test of step 1616 determines that the FCS of the MAC sub-frame is not correct (i.e., incorrect by failing the CRC check), then, at step 1618, the MAC sub-frame is discarded. At step 1619, a test by the receiving device determines whether another MAC sub-frame is available for processing. If the test of step 1619 determines that another MAC sub-frame is available, then, at step 1620, the receiving device employs the associated start field from the MAC descriptor of the next MAC sub-frame to find the location of that next MAC sub-frame in the packet for retrieval. From step 1620, the method returns to step 1615.

If the test of step 1619 determines that no further MAC sub-frames are available, then, at step 1621, the method terminates since the last MAC sub-frame intended for the receiving device has been processed. The receiving device may decide to enter some form of power saving mode during the remainder of the ongoing transmission (e.g. not detect and decode the remaining incoming MAC sub-frames).

Figure 17:
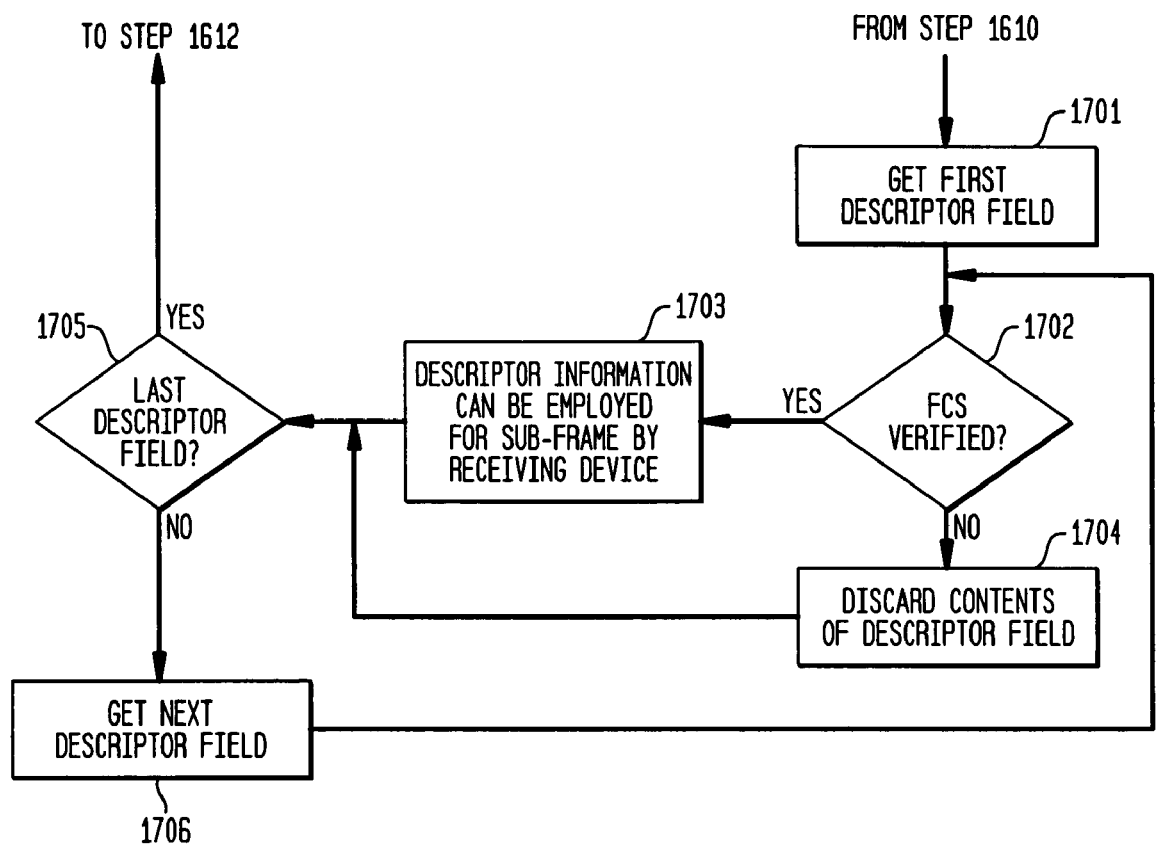
FIG. 17 shows an exemplary method of processing descriptor fields at step 1611 of FIG. 16.

FIG. 17 is an exemplary method of processing descriptor fields at step 1611 of FIG. 16. Beginning at step 1701, the independent (MAC) descriptor fields are processed, one by one. At step 1701, the first descriptor field is retrieved. At step 1702, for the descriptor field (e.g., descriptor field 1320(n)), a test verifies the sub-frame's FCS field (e.g., FCS field 1339 (n)) against the CRC over the retrieved descriptor.

When a receiving device detects errors during reception of a packet having an aggregated frame format, several different operations may occur. If an error is detected within the preamble or within the PLCP header, then the entire aggregated frame might be discarded. If one or more bit errors occur within a first part of the frame descriptor (i.e., in the header, the 2-byte 'Number-of-frames' field or the first FCS field of the frame descriptor), the entire aggregated frame might be discarded. If an error occurs within an independent descriptor fields, then that descriptor might be discarded. If an error occurs within a MAC sub-frame, then that sub-frame might be discarded.

If the test of step 1702 verifies the sub-frame FCS field is correct, then, at step 1703, the information within the descriptor (e.g., destination address and length of sub-frame) is valid for use by the receiving device. If the test of step 1702 does not verify the FCS as correct, then, at step 1704, the contents of the descriptor fields might be discarded. The associated sub-frame need not necessarily be discarded, as the receiving device may still receive that sub-frame without errors. From steps 1703 and 1704, the method advances to step 1705.

At step 1705, a test determines whether the last descriptor field has been processed. If the test of step 1705 determines that the last descriptor field has not been processed, then, at step 1706, the next descriptor field is retrieved and the method returns to step 1702. If the test of step 1705 determines that the last descriptor field has been processed, then the method advances to step 1612 of FIG. 16.

If an AP or STA device receives a packet with frame format conforming to frame aggregation in accordance with an embodiment of the present invention, but the AP or STA device does not support frame aggregation, then the receiving device might discard the frame. If, for example, the receiving device detects the preamble and decodes the PLCP header without errors, then at the start of the MAC frame the receiving device detects the frame descriptor. The receiving device determines that it does not support this packet frame type (either from the protocol version or the (sub-) type fields). Depending on the implementation, the receiving device may read the duration field and set the receiver's Network Allocation Vector (NAV) value accordingly (if the receiver validates the FCS-field value). The NAV is part of a clear channel assessment method and is employed to implement virtual channel assessment. Virtual channel assignment allows a device to claim that the wireless medium is occupied, even when it is actually not (e.g., in between transmissions), helping to reduce the number and effect of collisions.

While the exemplary embodiments of the present invention have been described with respect to methods or block diagrams, the functions of the present invention may be implemented in hardware as circuits, in state machines, or in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of generating a frame of aggregated data, the method comprising the steps of:
   (a) associating one or more user data frames into aggregated user data in accordance with a first layer;
   (b) generating, at an aggregation layer, one or more sub-frames from the aggregated user data by adding at least one header to the aggregated data, each sub-frame having a format in accordance with a second layer, wherein step (b) comprises the steps of:
      (b1) forming one or more sub-frames from the one or more user data frames by adding a sub-frame header in accordance with the second layer to each corresponding user data frame,
      (b2) grouping the one or more sub-frames with a predefined order based on a transmission characteristic, and
      (b3) adding a descriptor to the grouped sub-frames, wherein the descriptor is an aggregate frame descriptor comprising an aggregate frame header indicating a type of frame, a number of sub-frames, and at least one sub-frame descriptor for the sub-frames; and
   (c) forming an aggregated frame from the one or more sub-frames in accordance with a third layer.

2. The invention as recited in claim 1, wherein, step (a) includes the steps of grouping the one or more user data frames into a dummy frame as the aggregated data, and step (b) comprises the step of adding the header to the dummy frame in accordance with the second layer to generate a sub-frame.

3. The invention as recited in claim 2, wherein step (b) further comprises the step of adding error detection/correction information to the dummy frame.

4. The invention as recited in claim 1, wherein step (b) includes the steps of (b1) forming two or more sub-frames from the one or more user data frames by appending a sub-frame header in accordance with the second layer to each corresponding user data frame, (b2) grouping the two or more sub-frames into a dummy frame, and (b3) adding a dummy header to the dummy frame in accordance with the second layer.

5. The invention as recited in claim 4, wherein step (b1) further comprises the step of adding error detection/correction information to each sub-frame.

6. The invention as recited in claim 4, wherein step (b) further comprises the step of adding error detection/correction information to the dummy frame.

7. The invention as recited in claim 1, wherein step (b) includes the step of forming two or more sub-frames from the one or more user data frames by adding a sub-frame header in accordance with the second layer to each corresponding user data frame, and wherein step (c) includes the steps of (c1) grouping the two or more sub-frames with a predefined order, and (c2) adding a header to each sub-frame in accordance with the third layer.

8. The invention as recited in claim 7, wherein step (b) further comprises the step of adding error detection/correction information to each sub-frame.

9. The invention as recited in claim 1, wherein, for step (b3), the aggregate frame header comprises a frame control field indicating the type of frame is an aggregate frame.

10. The invention as recited in claim 1, wherein, for step (b3), the aggregate frame descriptor further comprises an error control field having error detection/correction information for the aggregate frame descriptor.

11. The invention as recited in claim 1, wherein, for step (b3), each sub-frame descriptor comprises an address corresponding to a receiving device for the associated sub-frame, and position information identifying a position of the associated sub-frame.

12. The invention as recited in claim 1, wherein, for step (b3), each sub-frame descriptor comprises an error control field having error detection/correction information for the corresponding sub-frame.

13. The invention as recited in claim 1, wherein step (b1) further comprises the step of adding error detection/correction information to each sub-frame.

14. The invention as recited in claim 1, wherein step (b2) groups the two or more sub-frames into sub-groups, each sub-group corresponding to a user data rate.

15. The invention as recited in claim 1, wherein, for step (b2), the transmission characteristic is at least one of a user data rate and a destination address.

16. The invention as recited in claim 1, wherein step (c) includes the step of adding at least one of a preamble and a third layer header to the sub-frame.

17. The invention as recited in claim 1, wherein, for steps (a), (b), and (c), the first and second layers are included in a data link layer, and the third layer is a physical layer.

18. The invention as recited in claim 17, wherein, for steps (a), (b), and (c), the second layer is a medium access control (MAC) layer.

19. The invention as recited in claim 18, wherein the physical layer and the MAC layer are in accordance with an Institute of Electronic and Electrical Engineers (IEEE)802.11 standard.

20. The invention as recited in claim 1, wherein the method is implemented as steps in a processor of an integrated circuit (IC).

21. The invention as recited in claim 20, wherein the IC is embodied in either an access point or a station operating in accordance with an IEEE 802.11 standard for wireless local area networks.

22. The invention as recited in claim 1, wherein step (a) comprises associating two or more user frames into aggregated user data in accordance with a first layer.

23. The invention as recited in claim 1, wherein, for step (b3), the aggregate frame header comprises a frame control field indicating the type of frame is an aggregate frame.

24. The invention as recited in claim 1, wherein, for step (b3), the aggregate frame descriptor further comprises an error control field having error detection/correction information for the aggregate frame descriptor.

25. The invention as recited in claim 1, wherein, for step (b3), each sub-frame descriptor comprises an address corresponding to a receiving device for the associated sub-frame, and position information identifying a position of the associated sub-frame.

26. The invention as recited in claim 1, wherein, for step (b3), each sub-frame descriptor comprises an error control field having error detection/correction information for the corresponding sub-frame.

* * * * *